(12) United States Patent
Leung et al.

(10) Patent No.: US 9,413,858 B2
(45) Date of Patent: *Aug. 9, 2016

(54) REAL-TIME COMPRESSIVE DATA COLLECTION FOR CLOUD MONITORING

(71) Applicant: Empire Technology Development LLC, Wilmington, DE (US)

(72) Inventors: Henry Leung, Calgary (CA); Xiaoxiang Liu, Calgary (CA)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/681,037

(22) Filed: Apr. 7, 2015

(65) Prior Publication Data

US 2015/0215433 A1 Jul. 30, 2015

Related U.S. Application Data

(63) Continuation of application No. 13/814,851, filed as application No. PCT/US2012/049884 on Aug. 8, 2012, now Pat. No. 9,032,072.

(51) Int. Cl.
*G06F 15/16* (2006.01)
*H04L 29/06* (2006.01)
*H04L 12/26* (2006.01)
*H04L 12/24* (2006.01)

(52) U.S. Cl.
CPC .............. *H04L 69/04* (2013.01); *H04L 41/142* (2013.01); *H04L 41/5012* (2013.01); *H04L 41/5096* (2013.01); *H04L 43/08* (2013.01); *H04L 43/10* (2013.01); *H04L 43/12* (2013.01)

(58) Field of Classification Search
CPC ......... H04L 43/08; H04L 43/10; H04L 41/42; H04L 41/5012; H04L 43/12; H04L 69/04
See application file for complete search history.

(56) References Cited

U.S. PATENT DOCUMENTS

| 5,901,246 | A | 5/1999 | Hoffberg et al. |
| 6,501,392 | B2 | 12/2002 | Gremmert et al. |
| 8,693,597 | B2 | 4/2014 | Sexton et al. |
| 8,855,011 | B2 | 10/2014 | Ortega et al. |

(Continued)

FOREIGN PATENT DOCUMENTS

CN 102571876 A 7/2012

OTHER PUBLICATIONS

Candan, K.S., "RanKloud: Scalable Multimedia and Social Media Retrieval and Analysis in the Cloud," Proceedings of the 9th workshop on Large-scale and distributed informational retrieval, pp. 1-2 (2011).

(Continued)

*Primary Examiner* — Moustafa M Meky
(74) *Attorney, Agent, or Firm* — Turk IP Law, LLC

(57) ABSTRACT

Technologies are presented for implementing a compressive-sensing-based data collection system in a cloud environment. In some examples, high-dimensional sensor data may be compressed using sparsity transforms and compressive sampling. The resulting low-dimensional data messages may be steered through a switch network to a cloud service manager, which then reconstructs the compressed messages for subsequent analysis, reporting, and/or comparable actions.

16 Claims, 10 Drawing Sheets

(56) References Cited

U.S. PATENT DOCUMENTS

| | | | |
|---|---|---|---|
| 8,963,916 B2* | 2/2015 | Reitan | G06F 3/011 345/419 |
| 9,032,072 B2* | 5/2015 | Leung et al. | 709/224 |
| 2011/0145836 A1 | 6/2011 | Wheeler et al. | |
| 2012/0014289 A1 | 1/2012 | Ortega et al. | |
| 2013/0070624 A1 | 3/2013 | Nguyen et al. | |
| 2013/0249947 A1* | 9/2013 | Reitan | G06F 3/011 345/633 |
| 2013/0335407 A1* | 12/2013 | Reitan | G06F 3/011 345/419 |
| 2014/0063061 A1* | 3/2014 | Reitan | G09G 3/003 345/633 |

OTHER PUBLICATIONS

Greenberg, A., et al., "Towards a Next Generation Data Center Architecture: Scalability and Commoditization," Proceedings of the ACM workshop on Programmable routers for extensible services of tomorrow, pp. 57-62 (2008).

International Search Report and Written Opinion for International Patent Application No. PCT/US12/49884, mailed on Oct. 9, 2012.

Kung, H.T., et al., "CloudSense: Continuous Fine-Grain Cloud Monitoring With Compressive Sensing," In proceedings of 3rd USENIX Workshop on Hot Topics in Cloud Computing, pp. 1-6 (Jun. 14-15, 2011).

Luo, C., et al., "Compressive data gathering for large-scale wireless sensor networks," Proceedings of the 15th annual international conference on Mobile computing and networking, pp. 145-156 (2009).

Luo, C., et al., "Efficient Measurement Generation and Pervasive Sparsity for Compressive Data Gathering," IEEE Transactions on Wireless Communications, vol. 9, No. 12, pp. 3728-3738 (Dec. 2010).

Moore, J., et al., "Data Center Workload Monitoring, Analysis, and Emulation," in Eighth Workshop on Computer Architecture Evaluation using Commercial Workloads, pp. 1-8 (2005).

Pallickara, S.L., et al., "On the Processing of Extreme Scale Datasets in the Geosciences," Handbook of Data Intensive Computing, pp. 521-537.

Guang-Ming, S., et al., "Advances in Theory and Application of Compressed Sensing," Acta Electronica Sinica, vol. 37, Issue 5, pp. 1070-1081 (May 5, 2009) (English Abstract only).

* cited by examiner

REAL-TIME COMPRESSIVE DATA COLLECTION FOR CLOUD MONITORING

CROSS-REFERENCE TO RELATED APPLICATIONS

This Application is a continuation under 35 U.S.C. §120 of U.S. patent application Ser. No. 13/814,851 filed on Feb. 7, 2013 and patented as U.S. Pat. No. 9,032,072 on May 12, 2015, which is the National Stage filing under 35 U.S.C. §371 of PCT Application Ser. No. PCT/US12/49884 filed on Aug. 8, 2012, by the same inventors, commonly assigned herewith. The disclosures of the U.S. Patent Application and the PCT Application are hereby incorporated by reference in their entireties.

BACKGROUND

Unless otherwise indicated herein, the materials described in this section are not prior art to the claims in this application and are not admitted to be prior art by inclusion in this section.

Monitoring is one of the operational tasks in a cloud-based environment for fault detection, correction, and system maintenance. For example, utilization of servers and storage capacity may be regularly monitored. Monitoring of data may be useful for short-term management as well as for long-term capacity planning. Machine images run from the service catalog may also need to be monitored. Systems administrators may need to know which applications are used frequently. Monitoring may also include security monitoring, such as monitoring user activity, suspicious events, authentication failures or repeated unauthorized access attempts, and scanning of inbound and outbound network traffic.

End-users may need to be able to monitor usage of cloud resources, and receive alerts when additional resources are needed. These monitoring capabilities may include tools for monitoring CPU usage per computing resource, ratios between systems activity and user activity, and CPU usage from specific job tasks. Also, users may need access to predictive cloud analytics that allow them to capture trending data on memory utilization and file system growth, so that they can plan needed changes to computing resources before they encounter service availability issues. Not having these capabilities in place may prevent users from taking actions for optimizing cloud resources in use to meet changes in business demand.

Organizations deploying cloud computing services via third-party providers may need technology tools in place to monitor the third-party providers. As a part of their agreements with providers of public cloud services, organizations may request guarantees for levels of performance that service providers are expected to deliver. However, in order to ensure that these service levels are met, organizations may need to have independent monitoring tools in place that allow them to monitor not just actual levels of performance as experienced by business users, but also enable them to conduct root cause analysis of problems as they occur.

SUMMARY

The present disclosure generally describes technologies for providing real-time compressive data collection in cloud monitoring.

According to some example embodiments, a method for real-time compressive data collection in cloud monitoring may include receiving multi-dimensional data associated with performance of a cloud infrastructure collected by multiple probes within the cloud infrastructure, determining a sparsity feature of the received multi-dimensional data, and applying compressive sensing to compress the multi-dimensional data into single-dimensional data using the sparsity feature, the single-dimensional data being suitable for use to reconstruct the multi-dimensional data.

According to other example embodiments, a method for real-time compressive data collection in cloud monitoring may include receiving multiple messages from multiple probes within a cloud infrastructure at aggregator switches of the cloud infrastructure, generating multi-dimensional data associated with performance of the cloud infrastructure from the received messages, determining a sparsity feature of the multi-dimensional data, applying compressive sensing to compress the multi-dimensional data into single-dimensional messages using the sparsity feature, steering the single-dimensional messages to a service manager within the cloud infrastructure, and reconstructing the single-dimensional messages into multi-dimensional data at the service manager.

According to further example embodiments, a cloud-based datacenter configured to provide real-time compressive data collection in cloud monitoring may include multiple probes, multiple aggregators, and a cloud monitoring service. The multiple probes may be configured to collected data associated with performance of multiple nodes of a cloud infrastructure. The multiple aggregators may be configured to receive the collected data from the multiple probes, generate multi-dimensional data from the received data, determine a sparsity feature of the multi-dimensional data, and apply compressive sensing to compress the multi-dimensional data into single-dimensional data using the sparsity feature, the single-dimensional data being suitable for use to reconstruct the multi-dimensional data into single-dimensional data using the sparsity feature. The cloud monitoring service may be configured to manage steering of the single-dimensional data to a service manager.

According to yet other example embodiments, a computer-readable storage medium may have instructions stored thereon for real-time compressive data collection in cloud monitoring. The instructions may include receiving multi-dimensional data associated with performance of a cloud infrastructure collected by multiple probes within the cloud infrastructure, determining a sparsity feature of the received multi-dimensional data, and applying compressive sensing to compress the multi-dimensional data into single-dimensional data using the sparsity feature, the single-dimensional data being suitable for use to reconstruct the multi-dimensional data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
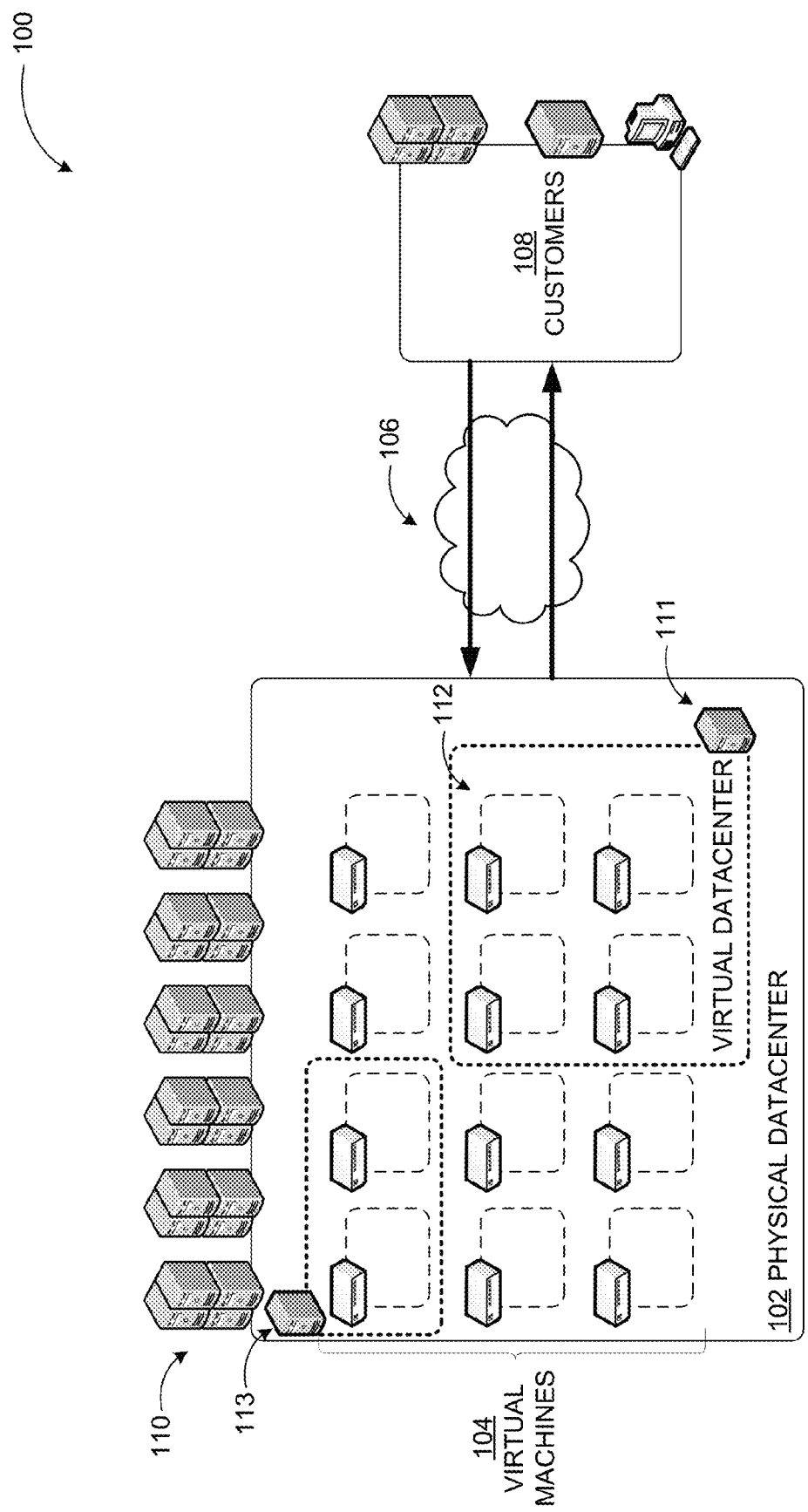
FIG. 1 illustrates an example system, where real-time compressive data collection in cloud monitoring may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to real-time compressive data collection in cloud monitoring.

Briefly stated, technologies are presented for compressive-sensing-based data collection in a cloud environment. In some examples, high-dimensional sensor data may be compressed using sparsity transforms and compressive sampling. The resulting low-dimensional data messages may be steered through a switch network to a cloud service manager, which then reconstructs the compressed messages for subsequent analysis, reporting, and/or comparable actions.

In many cloud environments, real-time continuous cloud monitoring, in which raw server status data are collected continuously, centralized data mining and decision making may be desirable. Such a global cloud monitoring model may provide many benefits. For example, frequent system-level status reports may allow for better decision-making by automated data center management systems and for maintaining geographically distributed, container-based data centers, since more subsystems failures can occur as the total system scales up.

One approach for real-time global cloud monitoring may involve retrieving "abnormal" server states instead of raw data, in order to reduce the volume of in-network data transmission. However, implementing this approach may be difficult, expensive, and/or undesirable because each server sensor may need to have a local processor and cache to "detect" the local "anomalies", and the sensors may have to be synchronized to report the states, which may lead to large overheads for local processing.

Another approach is to perform data compression before transmission. One challenge associated with this second approach is to design a data compression scheme with a minimum runtime footprint (i.e., easy to implement) while simultaneously having reasonable reconstruction performance Data compression techniques such as joint entropy coding or transform coding may be applied, but these techniques may be computationally intensive and may involve a large amount of data exchanges, resulting in significant overhead. In addition, performance may vary with compression ratio and network topology.

FIG. 1 illustrates an example system where scalable and robust anomaly detection for cloud monitoring may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Continuous cloud monitoring systems for assisting in centralized information discovery and decision making continuously collect "raw" sensor status data, route, and transmit to a central database for global data analytics (e.g., anomaly detection etc.). This is due to the fact that the modern cloud data analytics use data mining technologies to discover the "relations" among substantial amounts of data volume, where the data needs to update itself as frequently as possible while keeping as much as "raw" information. On the contrary, some centralized cloud monitoring systems exploit local detectors to filter the "raw" data, and then transmit the "detected data" or "event" with reduced dimensions to the central monitoring applications.

The continuous monitoring approach using global or local detectors may not be desirable to new cloud monitoring frameworks. For example, in increasingly complicated anomaly detection, the new frameworks need data mining approaches to take advantage of the dependence or correlations among the "raw" status data, enabling a more comprehensive understanding of the underlying data volume. The dependency or correlation may be the spatial relations among a cluster of nodes, or the temporal relations with respect to one or a cluster of nodes. In such scenarios, the full utilization of entire information and their correlations in spatial and/or temporal domain may contribute to the success of anomaly detection. If individual "local" detectors are applied instead, as in the conventional cloud monitoring architectures, the "detected" events may be likely to lose their dependency information. As a result, the conventional cloud monitoring lacks the capability of performing advanced global data analytics in real time to satisfy the growing complexity and need for cloud monitoring.

Some monitoring tools may allow for the monitoring of application response time, service availability, page load time, and traffic during peak times. Therefore, an efficient real-time monitoring system may be a benefit to both a cloud service provider and a consumer. An efficient cloud monitoring system may offer several benefits.

For example, such a tool may allow performance issues to be prevented and/or resolved in a timely manner. Organizations that have visibility into resource utilization in the cloud may be more likely to make educated and timely decisions about resource allocation and, therefore, to prevent performance problems before they impact their business users.

In another example, resources may be easily adjusted to reflect changes in business demand. Full visibility into the performance of cloud services may allow organizations to unlock the benefits of cloud computing, especially when it comes to improved flexibility of IT management. Organizations that have end-to-end visibility into the performance of cloud services and their internal infrastructure may be able to make decisions about adding or subtracting resources to support changes in business demand, which may allow them to ensure a high level of quality of end-user experience at optimal cost.

In a further example, monitoring may allow spending decisions to be optimized Organizations deploying independent tools for monitoring performance, service-level agreement (SLA) achievements, and usage of cloud services may be more likely to be able to make educated decisions about the return they are getting from their investment in cloud services.

Figure 2:
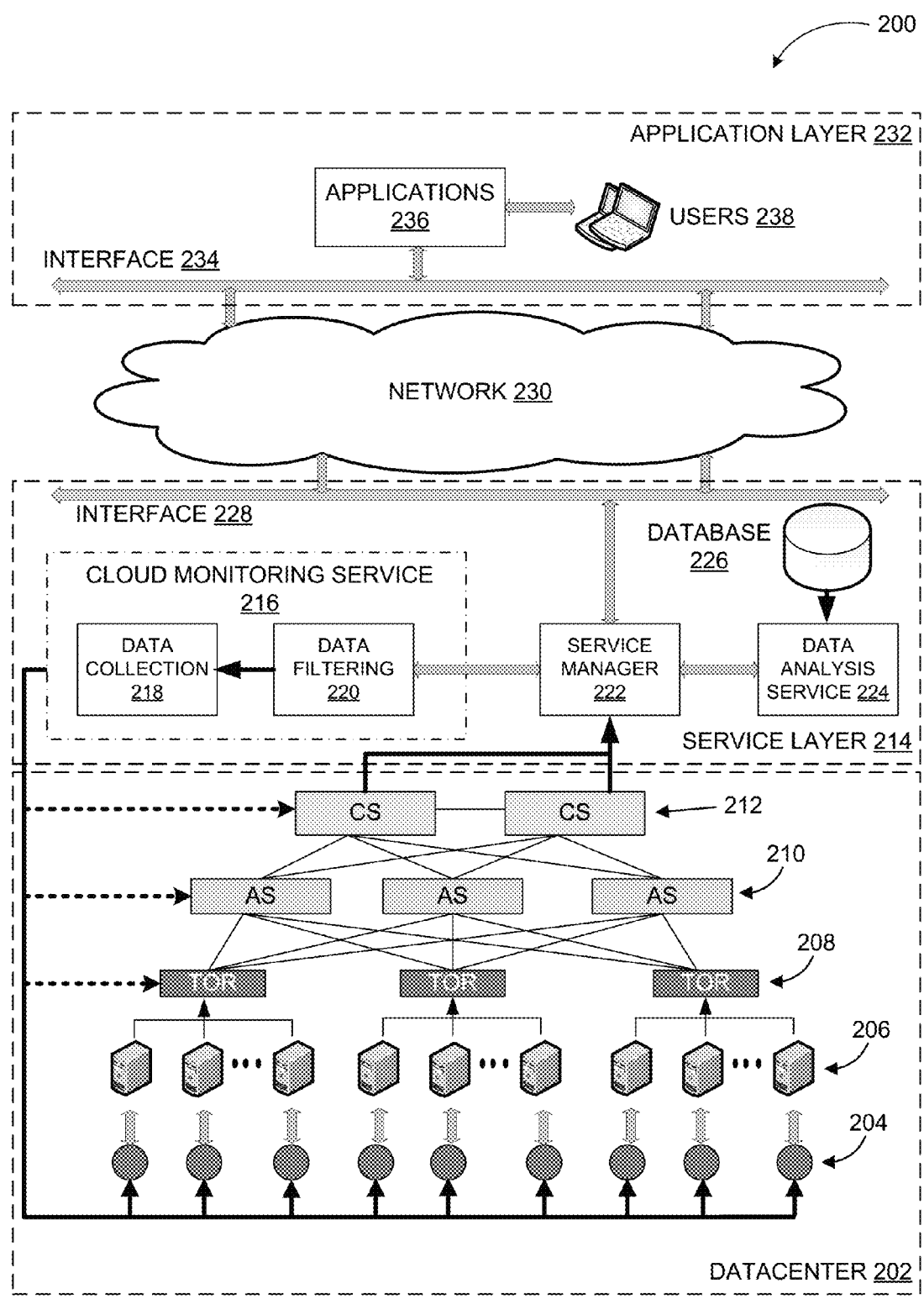
FIG. 2 illustrates a system-level architecture of an overall cloud monitoring system, where real-time compressive data collection in cloud monitoring may be implemented.

FIG. 2 illustrates a system-level architecture of an overall cloud monitoring system, where real-time compressive data collection in cloud monitoring may be implemented, arranged in accordance with at least some embodiments described herein.

The cloud monitoring system may be configured for infrastructure and/or applications monitoring. For example, the cloud monitoring system may track central processing unit (CPU) and memory utilization for adjusting resource allocation and/or track disk input/output operations to ensure sufficient throughput to meet service-level agreements (SLAs). The cloud monitoring system may also monitor application logs to look for adverse events or warnings of potential problems, monitor jobs and workflows running in the cloud (e.g., running time, resources allocated, and resource cost), and/or monitor context information to provide Quality of Context (QoC) for cloud context-awareness services.

As shown in a diagram 200, the system-level architecture of a cloud-monitoring system may include a datacenter 202, similar to the datacenter 102 described above in FIG. 1. The datacenter 202 may interface with a service layer 214, which in turn may communicate with an application layer 232 via a network 230. The datacenter 202 may include one or more servers 206 (similar to the servers 110, 111, or 113 described above in FIG. 1), some of which may be organized into server racks of one or more servers. Each server rack may be connected to a top-of-rack (TOR) switch 208. Each of the TOR switches 208 may connect to one or more aggregation switches 210, each of which in turn may connect to one or more core switches 212. The core switches 212 may connect to a service manager 222 in the service layer 214. The datacenter 202 may also include one or more sensors 204. In some embodiments, each of the servers 206 may be associated with one or more of the sensors 204. The sensors 204 may be configured to probe the status of an associated server in real time. For example, the sensors may measure server states that include server temperature, CPU usage, memory usage, network usage, and/or any other suitable server parameter. The server data and parameters measured by the sensors 204 may be aggregated and transmitted through the hierarchy of switches (i.e., the TOR switches 208, the aggregation switches 210, and the core switches 212) until reaching the service manager 222 in the service layer 214.

The service manager 222 may then transmit the received sensor data to a data analysis service module 224 for analysis. In some embodiments, a database 226, which may be an expert knowledge system or may store historical sensor data, may provide support to the data analysis service module 224 for anomaly detection and decision support. The service manager 222 may then generate status reports for the system based on the analysis. Subsequently, one or more users 238 residing in the application layer 232 may request one or more applications 236 (e.g., real-time monitoring service and analytic tools) to obtain the status reports from the service manager 222 using cloud-based service interfaces 234 and 228 via the network 230. For example, a web graphic user interface (GUI) may be available for the users 238 to monitor the status of the servers 206 via a cloud-based web service.

In some embodiments, the sensor data received by the service manager 222 may be encoded and/or compressed in order to reduce data traffic. The service manager 222 may decode and reconstruct the received sensor data before transmitting the data to the data analysis service 224. The service manager 222 may also transmit the sensor data to a cloud monitoring service 216, also included in the service layer 214. The cloud monitoring service 216 may provide control parameter data via a data collection module 218 to the sensors 204, the TOR switches 208, the aggregation switches 210, and the core switches 212 in order to control the real-time sensor data collection and routing process. In order to fine-tune the data collection and routing process, the cloud monitoring service 216 may filter sensor data received from the service manager 222 with a data filtering module 220 and use the filtered data to adjust data collection and routing parameters. In some embodiments, the data filtering module 220 may be configured to reduce the amount of sensor data aggregated through the switching network and therefore enable the data collection module 218 to (a) implement a desired data sampling and encoding (i.e. compression) scheme and (b) to more efficiently steer the encoded sensor data via the switches.

Figure 3:
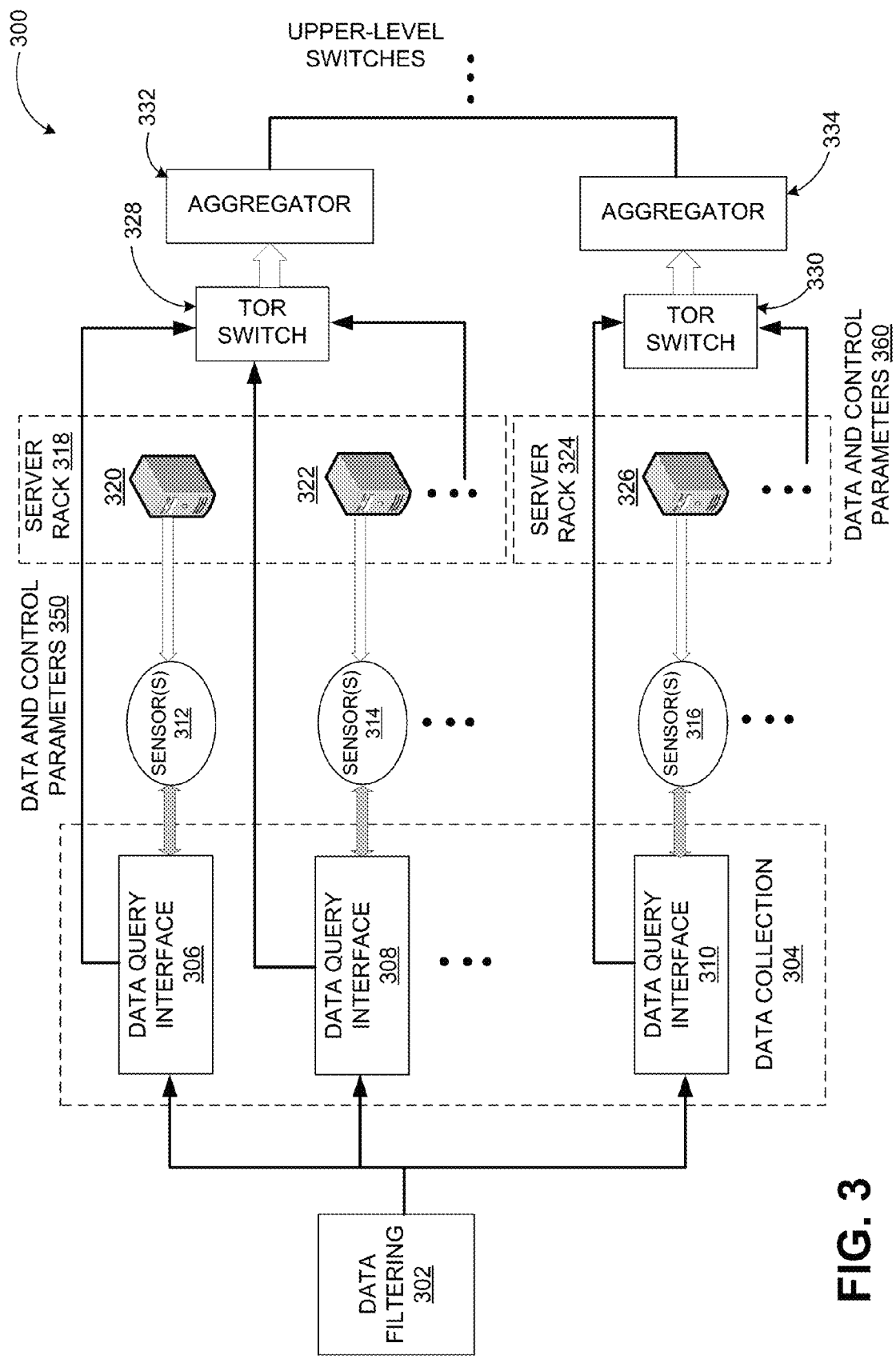
FIG. 3 illustrates an example system architecture and data flow for the data filtering and data collection modules of FIG. 2.

FIG. 3 illustrates an example system architecture and data flow for the data filtering and data collection modules of FIG. 2, arranged in accordance with at least some embodiments described herein.

As shown in a diagram 300, a data filtering module 302 (similar to the data filtering module 220 in FIG. 2) may be coupled to one or more data query interfaces 306, 308, and 310 implemented within a data collection module 304 (similar to the data collection module 218 in FIG. 2). The data query interfaces 306, 308, and 310 may initialize, control, and receive sensor data from sensors 312, 314, and 316, each of which may collect data from servers 320, 322, and 326. The data query interfaces 306, 308, and 310 may also provide data and control parameters 350 to TOR switches 328 and 330. In some embodiments, the data and control parameters 350 may include sensor data received from the sensors 312, 314, and 316. Since the raw sensor data may include different types of information of different data formats, the data query interfaces 306, 308, and 310 may reformat and/or reorganize the data into a unified data structure. For example, a unified data structure may include a header indicating a sensor identifier (i.e., type, location, etc.), a server identifier, a time, a data type, a sampling frequency, precision, units, data availability, and/or the entity incorporating the data values.

In some embodiments, while the sensors 312, 314, and 316 send sensor readings to the data query interfaces 306, 308, and 310 in real time, each of the sensors may have different sampling frequencies, and therefore all sensor data may not necessarily be available at certain times. In these cases, the data query interfaces may be configured to forward the available sensor readings while keeping the rest unavailable.

The data and control parameters 350 may also include control parameters for the TOR switches 328 and 330, as well as higher level switches, for controlling the routing of the sensor data. For example, the control parameters may include sparse transform coefficients and/or random construction matrices (described in more detail below). Each of the TOR switches 328 and 330 may receive data and control parameters associated with one of server racks 318 and 324, and in some embodiments, the TOR switches 328 and 330 may also receive data and control parameters 360 from components on the server racks 318 and 324. The TOR switches 328 and 330 may then transmit data to aggregators 332 and 334, which may then pass the data to further upper-level switches.

Figure 4:
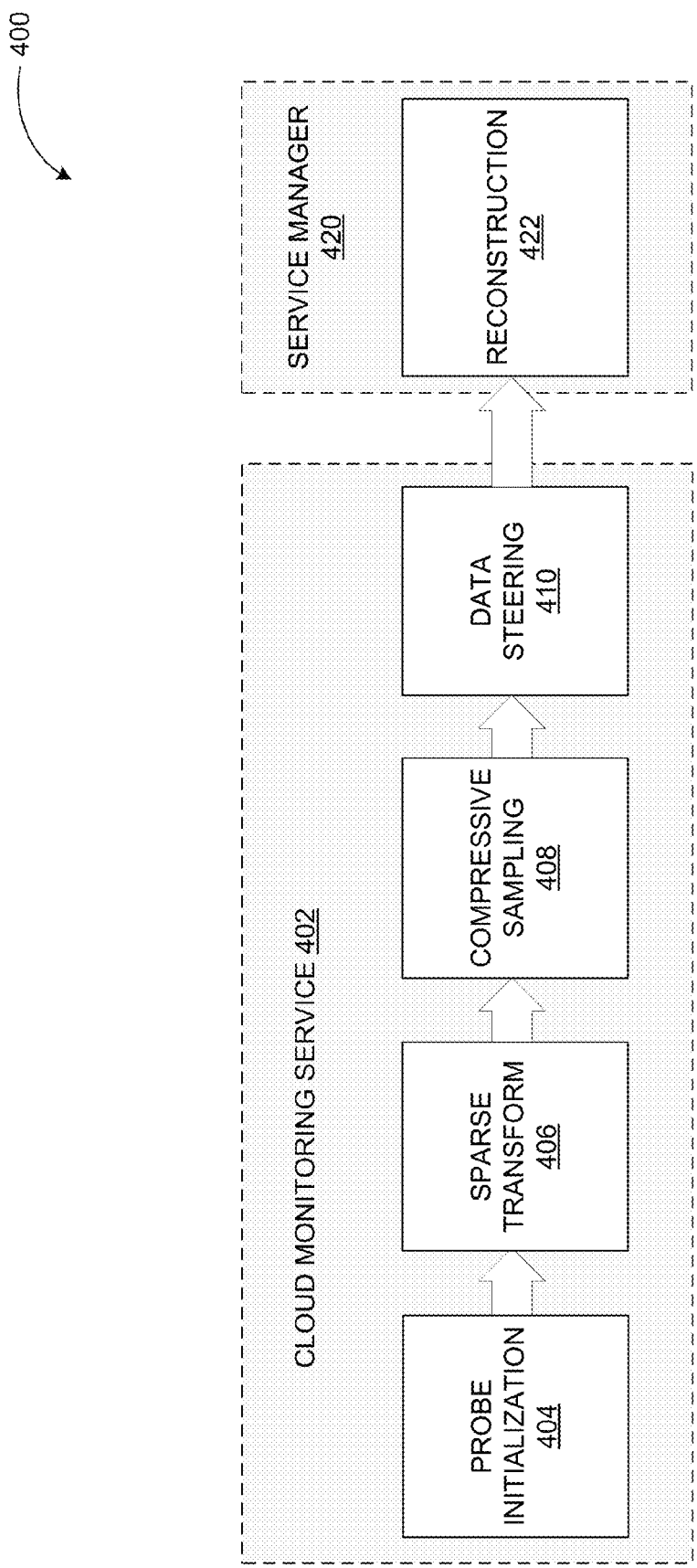
FIG. 4 illustrates an example compressive data collection and reconstruction procedure.

In some embodiments, a compressive sensing (CS) approach may be used for data filtering, which may maintain real-time monitoring performance while reducing data traffic. FIG. 4 illustrates an example compressive data collection and reconstruction procedure, arranged in accordance with at least some embodiments described herein.

As shown in a diagram 400, a cloud monitoring service 402 (similar to the cloud monitoring service 216 in FIG. 2) may communicate with a service manager 420 (similar to the service manager 222 in FIG. 2). The cloud monitoring service 402 may include a probe initialization module 404, a sparse transformation module 406, a compressive sampling module 408, and a data steering module 410. The service manager 420 may include a reconstruction module 422.

The probe initialization module 404 may be configured to initiate one or more sensor probes (e.g., the sensors 204 in FIG. 2). A probe may be the physical instance of a data source from which state data is to be collected. For example, a probe may include a processing unit, a virtual machine and associated monitoring sensor, or a server (e.g., the servers 206 in FIG. 2) and any associated sensors, and state data may include a property of the probe, e.g., CPU temperature. The probe initialization module 404 may initialize one or more work threads. In some embodiments, the probe initialization module 404 may initialize two work threads: a producer thread and a consumer thread. The producer thread may collect data from probes, while the consumer thread may read the collected data. Data producers and consumers may be connected via a network that distributes the collected measurements, and data collection and distribution may be provided by different elements of the monitoring system such that the distribution framework may be modified without modifying all of the producers and consumers. Data transmission rates for raw and compressed data may be adjusted on demand by, e.g., the data collection module 218 in FIG. 2, based on real-time monitoring service specifications.

After the probes are initialized by the probe initialization module 404, they may begin measuring state data and transmitting messages containing the state data to, e.g., the data collection module 218 in FIG. 2. While in some embodiments each probe may be associated with a single state or measured parameter, in other embodiments each probe may be associated with multiple states from different sensor readings. Therefore the state data messages transmitted by a probe may take the form of a multi-dimensional vector. For example, one dimension may represent the type of sensed data (temperature, network traffic, memory usage, etc.) while another dimension may represent different instances of the sensed data (time, location, etc). In another example, each dimension may represent one type of the sensed data. If there are three sensor types, resulting in three states readings, then a three dimensional vector may be constructed with each dimension corresponding to one sensor state. In order to compress the messages, the sensed data may be transformed via the sparse transform module 406 and then subsequently compressed via the compressive sampling module 408, both of which are described in more detail below in relation to FIG. 5. The data steering module 410 may then steer the compressed messages to the service manager 420. Finally, the reconstruction module 422 in the service manager 420 may reconstruct the compressed messages received by the service manager 420.

In some examples, probes in a cloud monitoring system may be associated with multiple states from different sensor readings, resulting in probe messages having multi-dimensional vectors. Since these probe messages are transmitted through the switch network in a datacenter as described above in FIG. 2, compressing the multi-dimensional vectors in these messages may reduce network traffic and improve the efficiency of the cloud monitoring system.

Figure 5:
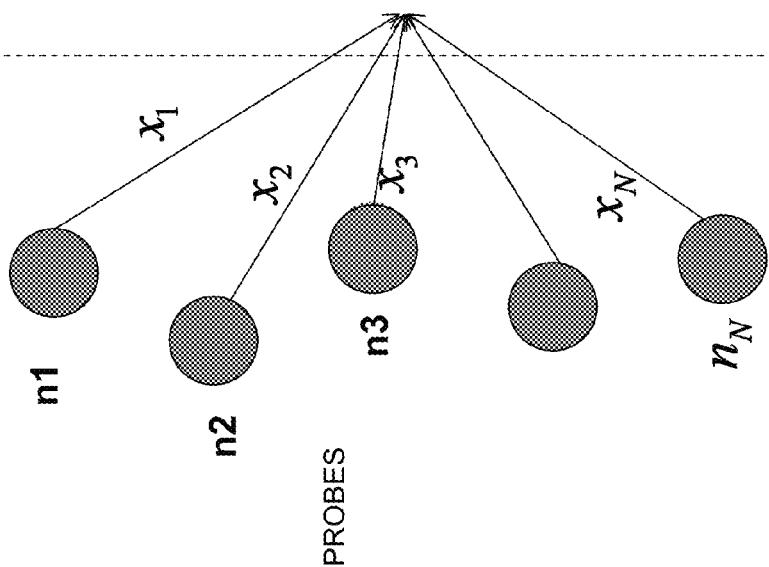
FIG. 5 illustrates mathematical representations of state data in a system according to some examples.
Figure 5:
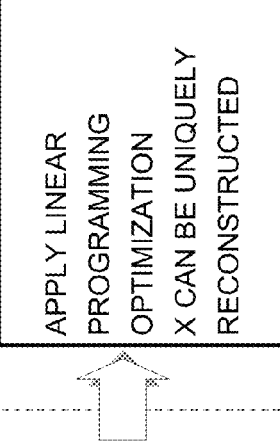

FIG. 5 illustrates representations of state data in a system according to some examples, arranged in accordance with at least some embodiments described herein.

As shown in a diagram 500, multi-dimensional state data may be collected from a number of probes in a data collection operation 510. For example, if there are N probes, each probe may provide a message $x_i$ (i=1, . . . , N), which may encapsulate its individual set of states in a multi-dimensional vector. To reduce the complexity of representation, an organization of the multi-dimensional vector may be changed. For example, individual sensor readings may be separated and processed according to dimension, or the messages may be vectorized and then concatenated into a single raw vector x. In some embodiments, sparsity measures may be used to help compress messages. For example, the raw message x may be K-sparse, where K<<N. Signal sparsity may characterize the correlation within a signal. If an N dimensional vector x is K-sparse, there exists a domain in which x can be represented by K (K<<N) non-zero coefficients (x's "sparse domain"). Therefore, the size of a K-sparse N-dimensional message may be reduced by transforming the message into its sparse domain. For example, discrete cosine transforms or wavelet transforms may be employed to transform the message. If a message includes states from multiple probes, each state may be transformed into its sparse domain via different sparse transformation approaches. In some embodiments, the sparse transformation may be performed by a sparse transformation module such as the sparse transform module 406 described in FIG. 4.

Subsequently, the K-sparse raw message x may be compressed in a compression operation 520 to form compressed messages y. The compression operation 520 may be performed by a compressive sample module, similar to the compressive sample module 408 in FIG. 4. In some embodiments, the compression operation 502 may include multiplying a random construction matrix of size M by N with the raw message x to form a compressed message y, as follows:

$$y = \Phi x \qquad [1]$$

or $$\begin{bmatrix} y_1 \\ y_2 \\ \vdots \\ y_M \end{bmatrix} = \begin{bmatrix} \phi_{11} & \phi_{12} & \cdots & \phi_{1N} \\ \phi_{21} & \phi_{22} & \cdots & \phi_{2N} \\ \vdots & \vdots & \vdots & \vdots \\ \phi_{M1} & \phi_{M2} & \cdots & \phi_{MN} \end{bmatrix} \begin{bmatrix} x_1 \\ x_2 \\ \vdots \\ x_N \end{bmatrix} \quad [2]$$

where y is the M-coded compressed message, $\Phi$ is the random construction matrix, and x is the raw message.

In equation (2), each column of $\Phi$ may contain a series of random numbers for the corresponding probe (and single-dimensional vector). The random matrix $\Phi$ may be generated by including a random seed generator in the data filtering module (e.g., the data filtering module 220 in FIG. 2) so that the random coefficients are transmitted together with raw sensor readings from the sensors up to a central node (e.g., the service manager 222 in FIG. 2). In other embodiments, the random matrix $\Phi$ may not be transmitted along the entire network. In these embodiments, the central node may instead first broadcast a global random seed to the entire network. An individual probe may then generate its own seed using the global random seed and a unique probe identifier, and may use a pseudo-random number generator to generate the coefficients of the random matrix $\Phi$. These coefficients may then be reproduced at the central node, assuming that the central node knows the identifiers of all the probes, without having to transmit the entire random matrix $\Phi$ along the entire network.

Once the data has been compressed, it may be used, along with the random coefficients (transmitted along the network or reproduced at the central node) to reconstruct the raw data in a subsequent reconstruction operation 530. In some embodiments, the reconstruction operation 530 may be performed by a reconstruction module, such as the reconstruction module 422 in FIG. 4.

After a message has been compressed as described above, but before reconstruction, the message may be steered along the network by a data steering module such as the data steering module 410 described in FIG. 4.

Figure 6:
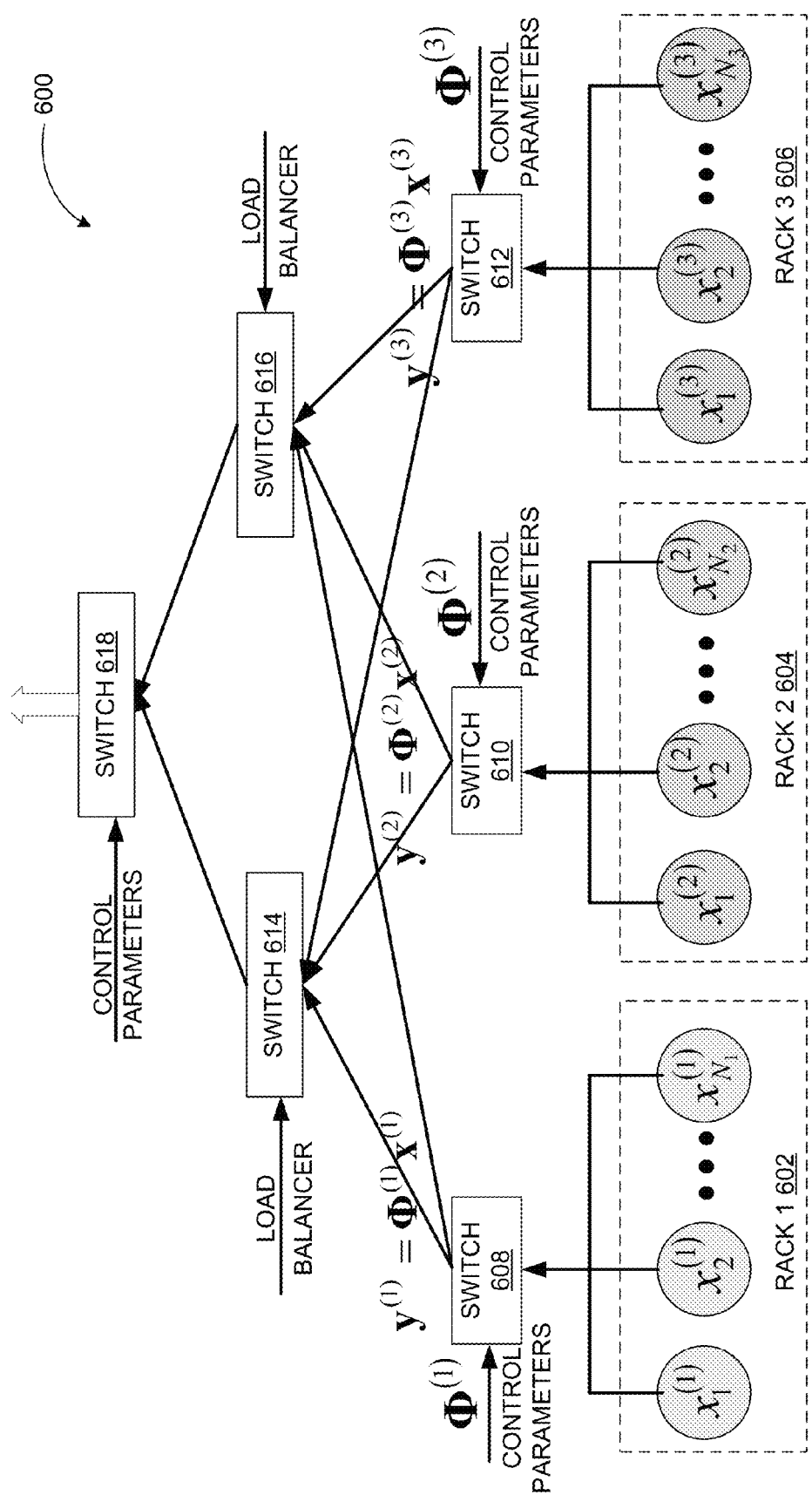
FIG. 6 illustrates an example datacenter network architecture for data steering.

FIG. 6 illustrates an example datacenter network architecture for data steering, arranged in accordance with at least some embodiments described herein.

As shown in a diagram 600, a datacenter network architecture may include multiple server racks 602, 604, and 606 that connect to a switch network with multiple levels. The first switch level may include switches 608, 610, and 612, and in some embodiments may be TOR switches (e.g., the TOR switches 208 in FIG. 2 or the TOR switches 328 and 330 in FIG. 3). The second switch level may include switches 614 and 616, and in some embodiments may be aggregation switches (e.g., the aggregation switches 210 in FIG. 2 or the aggregators 332 and 334 in FIG. 3). The third switch level may include switch 618, which in some embodiments may be a core switch (e.g., the core switches 212 in FIG. 2). While three server racks and three switch levels are depicted in the diagram 600, it should be understood that more or fewer racks and/or switch levels may be included in a datacenter network architecture.

In the diagram 600, the server racks 602, 604, and 606 may have sparse message structures $[x_1^{(1)} x_2^{(1)} \ldots x_{N_1}^{(t)}]^T$, $[x_1^{(2)} x_2^{(2)} \ldots x_{N_2}^{(2)}]^T$, $[x_1^{(3)} x_2^{(3)} \ldots x_{N_3}^{(3)}]^T$ respectively, formed from the sensors and associated servers in each rack (superscript T refers to transform). These messages may be encoded via compressive sampling and then steered through the network towards the switch 618. Because the messages from each rack may be independent, there may be multiple ways to encode and compress the raw messages at the switches 608, 610, and 612. However, different encoding strategies may affect the final reconstruction process as well as the performance of the data steering process.

One encoding approach may be to assign each rack an independent random construction matrix. According to equation (1) above, $y^{(1)}=\Phi^{(1)}x^{(1)}$, $y^{(2)}=\Phi^{(2)}x^{(2)}$, and $y^{(3)}=\Phi^{(3)}x^{(3)}$, where $\Phi^{(1)}$ is $M_1 \times N_1$, $\Phi^{(2)}$ is $M_2 \times N_2$, and $\Phi^{(3)}$ is $M_3 \times N_3$ and $M_1 \ll N_1$, $M_2 \ll N_2$, and $M_3 \ll N_3$. The encoded measurements $y^{(1)}$, $y^{(2)}$ and $y^{(3)}$ may be steered directly via the multiple levels of switches to the switch 618. Using this encoding approach, data reconstruction may need to be carried out on encoded measurements three times by resolving three linear programming optimization problems, as described below. However, it may be difficult to guarantee that the racks have sufficient servers for compressive sampling. For instance, finding a random construction matrix $\Phi^{(j)}$ satisfying $M_j \ll N_j$ may not always be possible if $N_j$ (e.g., the number of servers) is small.

Another encoding approach may be to divide the random construction matrix $\Phi$ into three portions as follows:

$$\begin{bmatrix} y^{(1)} \\ y^{(2)} \\ y^{(3)} \end{bmatrix} = \begin{bmatrix} \phi_{11}^{(1)} & \cdots & \phi_{1N_1}^{(1)} & \phi_{11}^{(2)} & \cdots & \phi_{1N_2}^{(2)} & \phi_{11}^{(3)} & \cdots & \phi_{1N_3}^{(3)} \\ \phi_{21}^{(1)} & \cdots & \phi_{2N_1}^{(1)} & \phi_{21}^{(2)} & \cdots & \phi_{2N_2}^{(2)} & \phi_{21}^{(3)} & \cdots & \phi_{2N_3}^{(3)} \\ \vdots & \cdots & \vdots & \vdots & \cdots & \vdots & \vdots & \cdots & \vdots \\ \phi_{M1}^{(1)} & \cdots & \phi_{MN_1}^{(1)} & \phi_{M1}^{(2)} & \cdots & \phi_{MN_2}^{(2)} & \phi_{M1}^{(3)} & \cdots & \phi_{MN_3}^{(3)} \end{bmatrix} \begin{bmatrix} x^{(1)} \\ x^{(2)} \\ x^{(3)} \end{bmatrix} \quad [3]$$

$$= [\Phi^{(1)} | \Phi^{(2)} | \Phi^{(3)}] \begin{bmatrix} x^{(1)} \\ x^{(2)} \\ x^{(3)} \end{bmatrix}$$

From Equation 3, $y^{(1)}=\Phi^{(1)}x^{(1)}=y^{(2)}=\Phi^{(2)}x^{(2)}$, and $y^{(3)}=\Phi^{(3)}x^{(3)}$ may be measurement vectors with the same size, M×1. After the measurements $y^{(1)}$, $y^{(2)}$ and $y^{(3)}$ may be steered to the reconstruction module (e.g., the reconstruction module 422 in FIG. 4), they may be concatenated into a single measurement $y=[y^{(1)} y^{(2)} y^{(3)}]^T$. In this case, data reconstruction may need to be applied once to the single measurement y. However, the measurement transfers in the switch network may not be balanced. For example, if $y^{(1)}$ and $y^{(2)}$ are steered via the switch 614 while $y^{(3)}$ is steered via the switch 616, then the load for the switch 614 will be twice the load of the switch 616.

Figure 7:
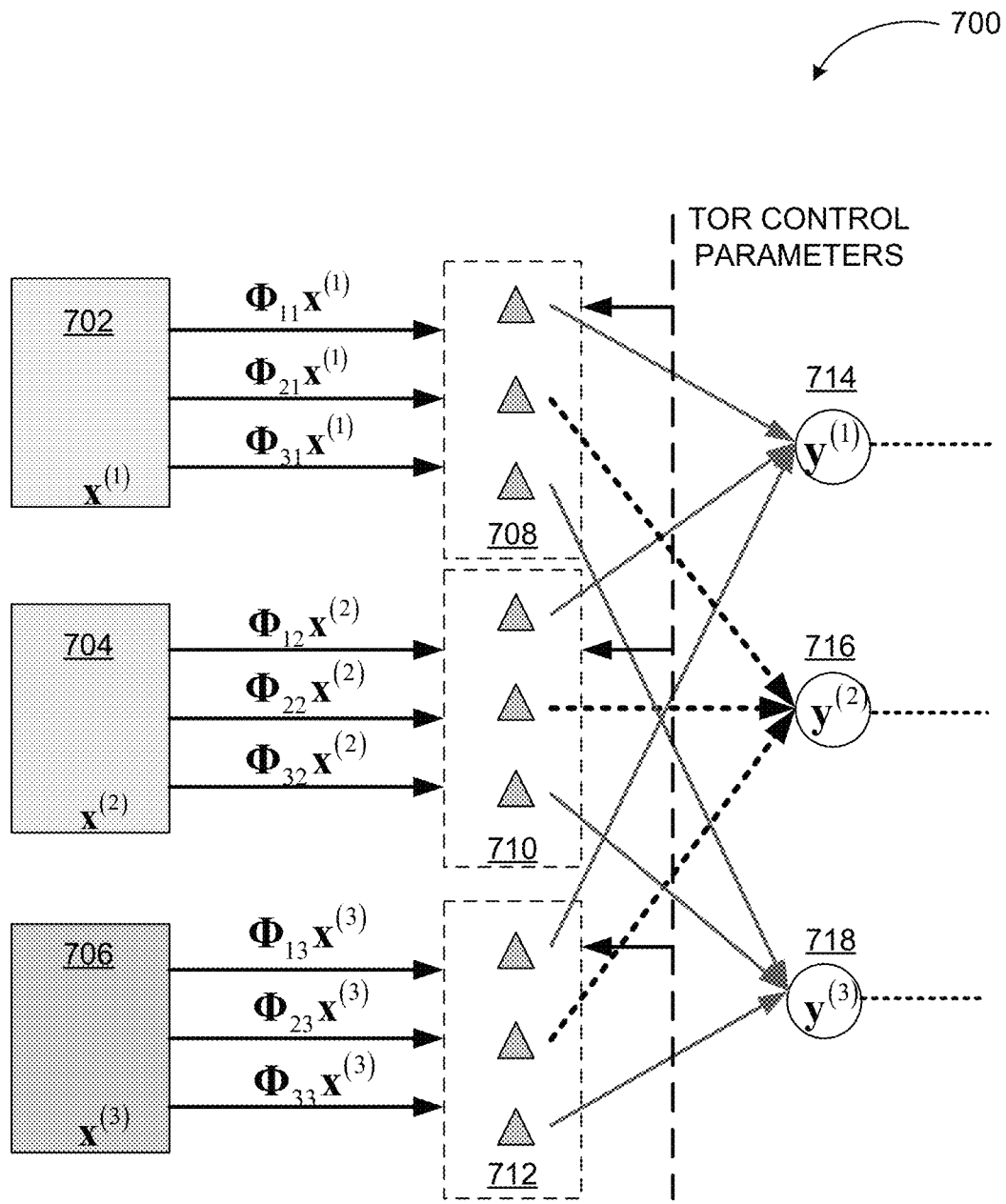
FIG. 7 illustrates example models for data steering.

Yet another encoding approach is depicted in FIG. 7, which illustrates example models for data steering, arranged in accordance with at least some embodiments described herein. As described in a diagram 700, the additional encoding technique may begin with partitioning the random construction matrix $\Phi$ into nine portions as follows:

$$\begin{bmatrix} y_{(M_1 \times 1)}^{(1)} \\ y_{(M_2 \times 1)}^{(2)} \\ y_{(M_3 \times 1)}^{(3)} \end{bmatrix} = \begin{bmatrix} \Phi_{11(M_1 \times N_1)} & \Phi_{12(M_1 \times N_2)} & \Phi_{13(M_1 \times N_3)} \\ \Phi_{21(M_2 \times N_1)} & \Phi_{22(M_2 \times N_2)} & \Phi_{23(M_2 \times N_3)} \\ \Phi_{31(M_2 \times N_1)} & \Phi_{32(M_3 \times N_2)} & \Phi_{33(M_3 \times N_3)} \end{bmatrix} \begin{bmatrix} x^{(1)} \\ x^{(2)} \\ x^{(3)} \end{bmatrix} \quad [4]$$

In the example case, the length of $y^{(1)}$, $y^{(2)}$ and $y^{(3)}$ are $M_1$, $M_2$, and $M_3$ respectively, which may be different numbers. At a switch 708 (similar to the switch 608 in FIG. 6), three matrix manipulations may be carried out: $\Phi_{11}x^{(1)}$, $\Phi_{21}x^{(1)}$, and $\Phi_{31}x^{(1)}$. Similar operations may be executed at the switches 710 and 712. Additional summations at the aggregator switches 714, 716, and 718 may be applied to obtain the encoded measurements $$y^{(1)} = \Phi_{11}x^{(1)} + \Phi_{12}x^{(2)} + \Phi_{13}x^{(3)},$$

$$y^{(2)} = \Phi_{21}x^{(1)} + \Phi_{22}x^{(2)} + \Phi_{23}x^{(3)}, \text{ and}$$

$$y^{(3)} = \Phi_{31}x^{(1)} + \Phi_{32}x^{(2)} + \Phi_{33}x^{(3)}.$$

To enable these summation operations, communication links may be provided between these switches. In addition, global control parameters that may be generated by a data filtering module (e.g., the data filtering module 220 in FIG. 2) may also be used to form the correct measurements. In this approach, the in-network loads due to data transmission may be easily balanced by introducing a load balancer (e.g., at the aggregator switches 714, 716, and 718, or at the switches 614 and 616 in FIG. 6). The load balancer may use a pre-defined load balancing mechanism calculated from pre-defined control parameters; or may dynamically assign the load balancing mechanism based on the network context. For example, in the situation depicted in FIG. 6, the load balancer may assign the steering mechanism such that $y^{(1)}$ and $y^{(3)}$ are steered upwards via the switch 614 and $y^{(2)}$ may be steered via the switch 616, if $M_1 + M_3 \approx M_2$. The load balancing scheme for data steering may be designed based on a set of control parameters.

Finally, the compressed data may be reconstructed by a reconstruction module (e.g., the reconstruction module 422 in FIG. 4). In some embodiments, the reconstruction module may be implemented by a service manager module (e.g., the service manager module 420 in FIG. 4 or the service manager module 222 in FIG. 2). The service manager module may be responsible for the instantiation of service applications (e.g., the cloud monitoring service 216 and/or the data analysis service 224 in FIG. 2) by requesting the creation and configuration of virtual execution environments for each service component. The service manager module may also include components for dynamically evaluating elasticity and SLA rules in order to maintain effective application execution. For these rules to be evaluated, the cloud monitoring service (e.g., the cloud monitoring service 216) may provide the control parameters generated for the whole system.

As explained in FIG. 5, a compression operation may include multiplying a random construction matrix of size M by N with a raw message x 702, 704, 706 to form a compressed message y. For a CS-based data collection and filtering approach, the service manager module may be configured to reconstruct the status message (e.g., the raw message x 702, 704, 706) from the measurement y (e.g., via a reconstruction module such as the reconstruction module 422 in FIG. 4). Reconstruction may occur using a linear programming optimization approach that solves an l-minimization problem:

$$\min_{d \in \mathbb{R}^N} \|d\|_l, \text{ subject to } y = \Phi x, x = \Psi d, \qquad [5]$$

where the message x 702, 704, 706 is assumed to be representable as $x = \Psi d$ in a predetermined basis $\Psi$. For a CS-based scheme, the K-sparse status message x may be uniquely reconstructed as long as (a) M<<N and (b) M>cK log(N/K), where c is a small constant.

Finally, the sparse domain information may be extracted from the reconstructed message x 702, 704, 706, and then x 702, 704, 706 may be transformed back to the original domain using the reverse sparse domain transform. The service manager module may then forward the reconstructed data for analysis by, e.g., the data analysis service 224 in FIG. 2.

Figure 8:
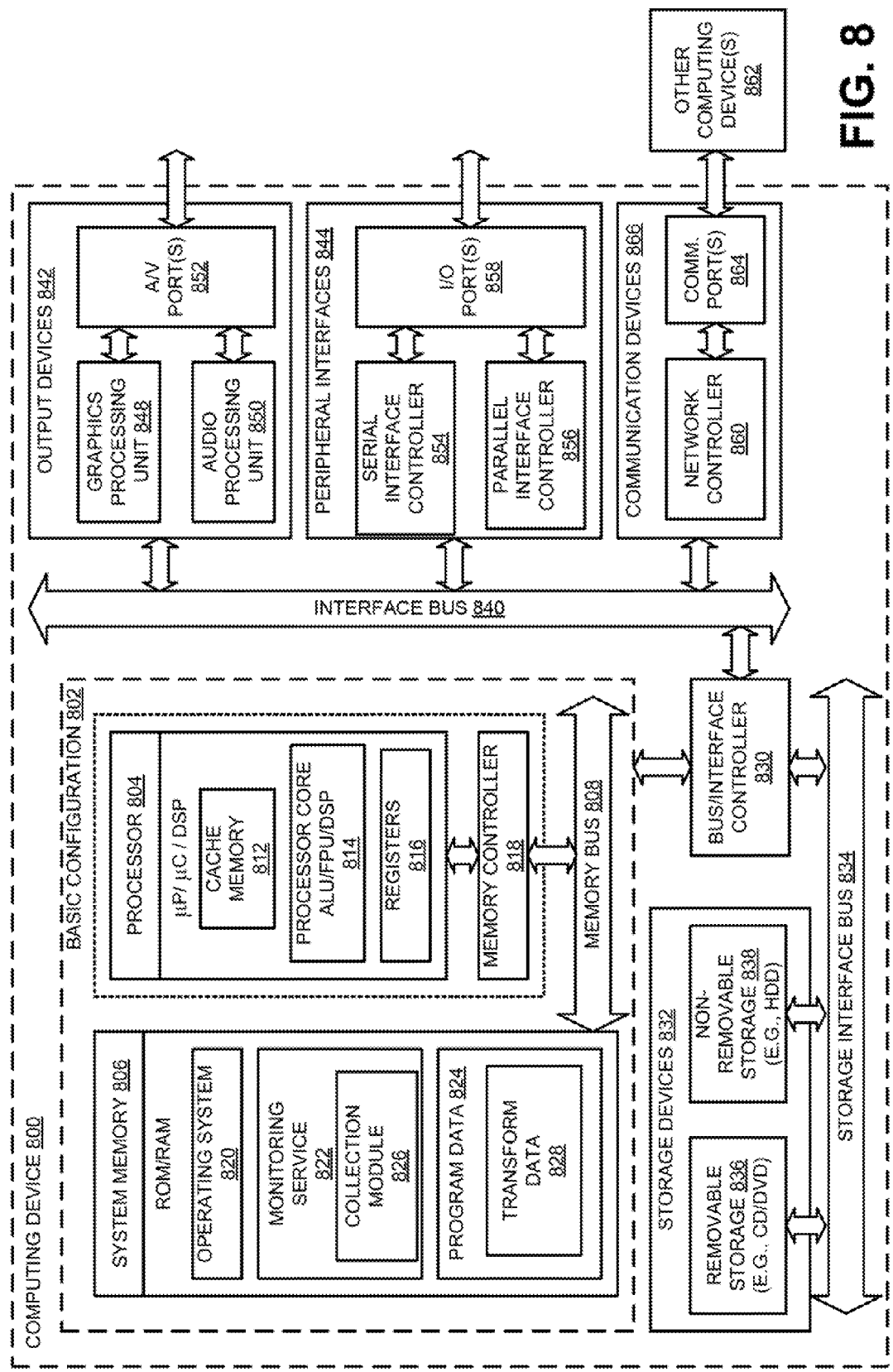
FIG. 8 illustrates a general purpose computing device, which may be used to implement real-time compressive data collection in cloud monitoring.

FIG. 8 illustrates a general purpose computing device 800, which may be used to implement real-time compressive data collection in cloud monitoring, arranged in accordance with at least some embodiments described herein. For example, the computing device 800 may be used to implementing a compressive-sensing-based data collection system as described herein. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (μP), a microcontroller (μC), a digital signal processor (DSP), or any combination thereof. The processor 804 may include one more levels of caching, such as a cache memory 812, a processor core 814, and registers 816. The example processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a monitoring service 822, and program data 824. The monitoring service 822 may include a collection module 826 for implementing real-time compressive data collection as described herein. The program data 824 may include, among other data, transform data 828 or the like, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., one or more output devices 842, one or more peripheral interfaces 844, and one or more communication devices 866) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 includes a network controller 860, which may be arranged to facilitate communications with one or more other computing devices 862 over a network communication link via one or more communication ports 864. The one or more other computing devices 862 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods for real-time compressive data collection in cloud monitoring. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 9:
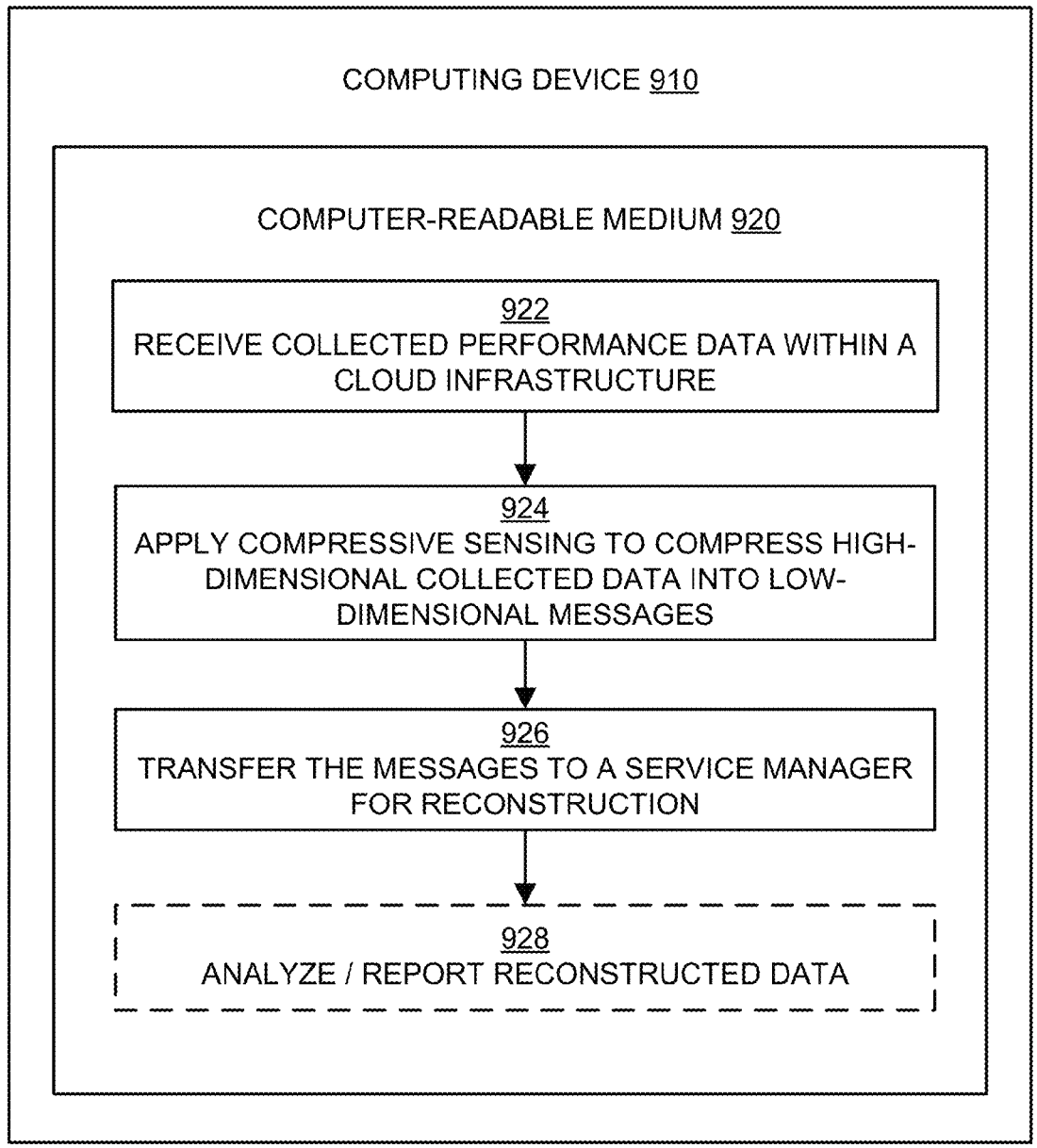
FIG. 9 is a flow diagram illustrating an example method for providing real-time compressive data collection in cloud monitoring that may be performed by a computing device such as the device in FIG. 8.

FIG. 9 is a flow diagram illustrating an example method for providing real-time compressive data collection in cloud monitoring that may be performed by a computing device such as the device in FIG. 8, arranged in accordance with at least some embodiments described herein. Example methods may include one or more operations, functions or actions as illustrated by one or more of blocks 922, 924, 926, and/or 928, and may in some embodiments be performed by a computing device such as the computing device 800 in FIG. 8. The operations described in the blocks 922-928 may also be stored as computer-executable instructions in a computer-readable medium such as a computer-readable medium 920 of a computing device 910.

An example process for providing real-time compressive data collection in cloud monitoring may begin with block 922, "RECEIVE COLLECTED PERFORMANCE DATA WITHIN A CLOUD INFRASTRUCTURE", where data and server states collected by sensors (e.g., the sensors 204 in FIG. 2) are received by, e.g., the cloud monitoring service 402 in FIG. 4, as described above. The performance data may be received in real time, and may include server temperature, CPU usage, memory usage, network usage, and/or any other suitable server parameter.

Block 922 may be followed by block 924, "APPLY COMPRESSIVE SENSING TO COMPRESS HIGH-DIMENSIONAL COLLECTED DATA INTO LOW-DIMENSIONAL MESSAGES", where a sparse transform module (e.g., the sparse transform module 406 in FIG. 4) may be applied to the performance data to transform high-dimensional data into low-dimensional data, as described above. Compressive sampling may then be applied to the low-dimensional data by a compressive sampling module (e.g., the compressive sampling module 408 in FIG. 4) to form compressed messages as described above in relation to FIG. 5. For example, a random construction matrix may be applied to low-dimensional data in order to form compressed messages.

Block 924 may be followed by block 926, "TRANSFER THE MESSAGES TO A SERVICE MANAGER FOR RECONSTRUCTION", where the compressed messages may be steered to a service manager module (e.g., the service manager module 222 in FIG. 2 or the service manager module 420 in FIG. 4) through a datacenter switch network as described above in relation to FIGS. 6 and 7. In some embodiments, the message steering may be implemented by a data steering module, such as the data steering module 410 in FIG. 4. The service manager module may then reconstruct the compressed messages using, e.g., a reconstruction module such as the reconstruction module 422 in FIG. 4, as described above.

Finally, in some embodiments, block 926 may be followed by optional block 928, "ANALYZE/REPORT RECONSTRUCTED DATA", where the reconstructed data may be analyzed by a data analysis service such as the data analysis service module 224 in FIG. 2. For example, the data may be analyzed to detect anomalies and/or to provide decision support for the service manager. In some embodiments, the reconstructed data may also be reported to one or more monitoring applications, such as applications 236 in FIG. 2.

Figure 10:
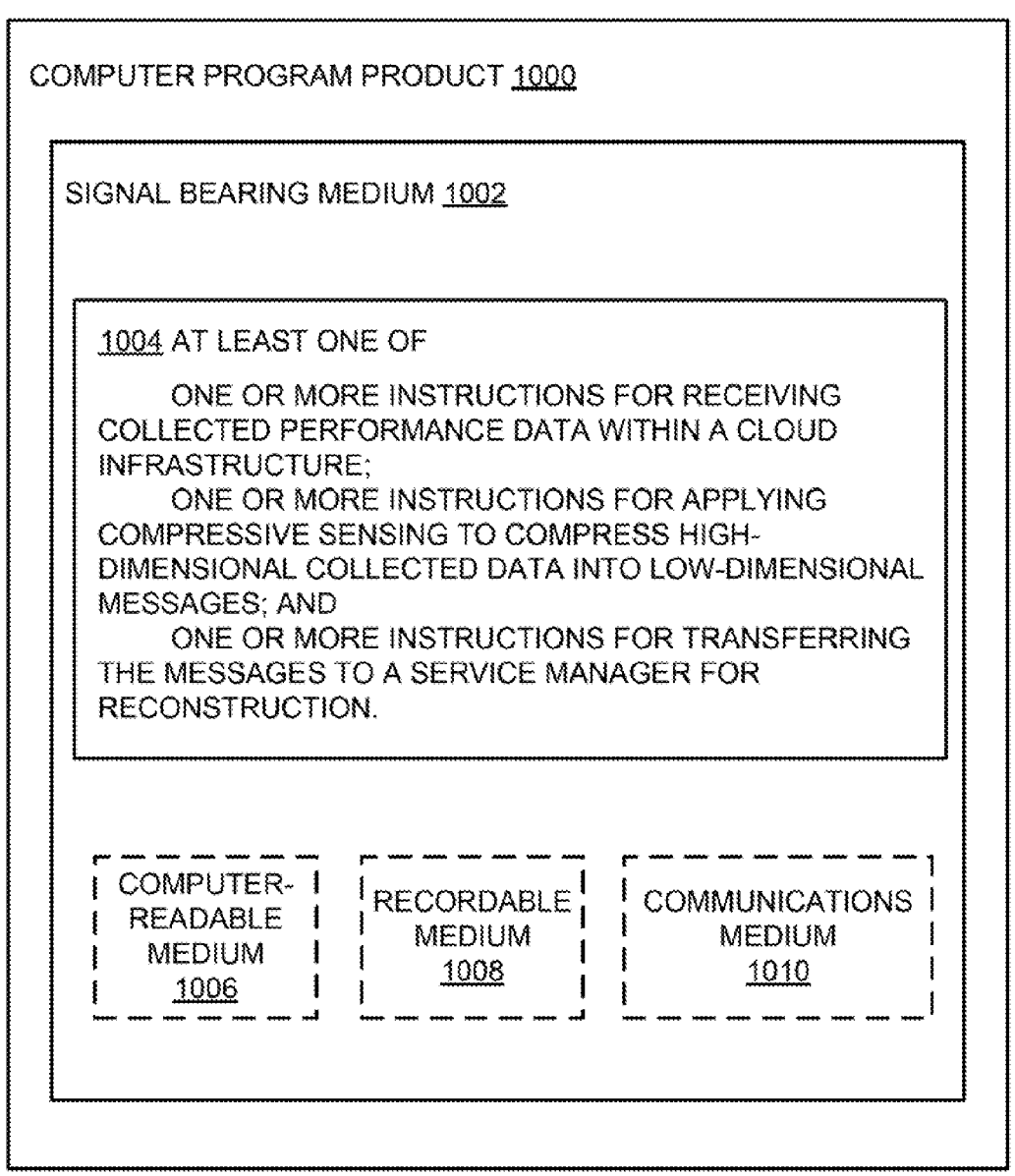
FIG. 10 illustrates a block diagram of an example computer program product, all arranged in accordance with at least some embodiments described herein.

FIG. 10 illustrates a block diagram of an example computer program product arranged in accordance with at least some embodiments described herein.

In some examples, as shown in FIG. 10, the computer program product 1000 may include a signal bearing medium 1002 that may also include one or more machine readable instructions 1004 that, when executed by, for example, a processor, may provide the functionality described herein. Thus, for example, referring to the processor 804 in FIG. 8, the monitoring service 822 may undertake one or more of the tasks shown in FIG. 10 in response to the instructions 1004 conveyed to the processor 804 by the signal bearing medium 1002 to perform actions associated with providing real-time compressive data collection in cloud monitoring as described herein. Some of those instructions may include, for example, receiving collected performance data within a cloud infrastructure, applying compressive sensing to compress high-dimensional collected data into low-dimensional messages, and transferring the messages to a service manager for reconstruction, according to some embodiments described herein.

In some implementations, the signal bearing medium 1002 depicted in FIG. 10 may encompass a computer-readable medium 1006, such as, but not limited to, a hard disk drive, a solid state drive, a Compact Disc (CD), a Digital Versatile Disk (DVD), a digital tape, memory, etc. In some implementations, the signal bearing medium 1002 may encompass a recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, the computer program product 1000 may be conveyed to one or more modules of the processor 804 by an RF signal bearing medium, where the signal bearing medium 1002 is conveyed by the wireless communications medium 1010 (e.g., a wireless communications medium conforming with the IEEE 802.11 standard).

According to some examples, a method for compressive sensing-based data collection in cloud monitoring may include receiving multi-dimensional data associated with performance of a cloud infrastructure collected by multiple probes within the cloud infrastructure, determining a sparsity feature of the received multi-dimensional data, and applying compressive sensing to compress the multi-dimensional data into single-dimensional data using the sparsity feature, the single-dimensional data being suitable for use to reconstruct the multi-dimensional data.

According to some embodiments, the method may further include reconstructing the single-dimensional data into multi-dimensional data at a service manager and/or one of analyzing or preparing a report based on the reconstructed multi-dimensional data for monitoring a cloud performance Each probe may be a physical instance of a data source within the cloud infrastructure providing state data, and the probes may include one or more of a processing unit, a monitoring sensor associated with a virtual machine, and a server. The state data may be associated with a property of a probe including one or more of a processor utilization, a memory utilization, a disk input/output (I/O) utilization, an adverse event associated with an application, a running time associated with an application, a resource allocation, context information, network usage, and disk temperature.

According to other embodiments, the method may further include initializing the multiple probes by initializing a producer thread and a consumer thread, where the producer thread collects data from the multiple probes and the consumer thread reads the collected data. The method may further include adjusting a single-dimensional data transmission rate within the cloud infrastructure according to a real-time monitoring service specification, compressing the multi-dimensional data by separating readings of each dimension of a probe vector that includes readings from multiple data sources and processing the separate readings respectively, and/or compressing the multi-dimensional data by vectorizing messages from each probe and concatenating the vectorized messages into a single vector.

According to further embodiments, the method may further include compressing the multi-dimensional data from the multiple probes employing a sparse transformation. The sparse transformation may include a discrete cosine transform and/or a wavelet transform. The method may further include applying compressive sampling to the transformed multi-dimensional data by multiplying a single-dimensional data vector with a random construction matrix, where each column of the random construction matrix includes a series of random numbers for a probe corresponding to the single-dimensional data vector. The method may further include broadcasting a random global seed from a central node of the cloud infrastructure, where each probe generates its own seed using the global seed and a probe identification to avoid transmitting the random construction matrix throughout the cloud infrastructure, and/or steering the single-dimensional data by splitting the random construction matrix into at least three segments to create at least three measurement vectors of equal size for each probe message, steering the same-size measurement vectors to a service manager, and concatenating the measurement vectors at the service manager.

According to yet other embodiments, the method may further include steering the single-dimensional data by partitioning the random construction matrix into at least nine segments to create at least three measurement matrices, steering the measurement matrices to a service manager, and obtaining individual encoded measurement vectors through summation operations at top-of-rack (TOR) switches. Communication links may be provided between switches of the cloud infrastructure and global control parameters to enable the summation operations, and the global control parameters may be generated at a data filtering module. The method may further include balancing transmission of the single-dimensional data through the switches by a load balancer that employs a pre-defined load-balancing mechanism computed from the global control parameters. The load balancer may dynamically assign the load-balancing mechanism based on a network context.

According to some embodiments, the method may further include steering the single-dimensional data directly via multiple levels of switches to a service manager. The method may further include reconstructing the single-dimensional data employing a linear programming optimization, extracting sparse domain information from the reconstructed single-dimensional data, and transforming the reconstructed single-dimensional data to an original state domain by applying a reverse sparse domain transform.

According to other examples, a method for compressive sensing-based data collection in cloud monitoring may include receiving multiple messages from multiple probes within a cloud infrastructure at aggregator switches of the cloud infrastructure, generating multi-dimensional data associated with performance of the cloud infrastructure from the received messages, determining a sparsity feature of the multi-dimensional data, applying compressive sensing to compress the multi-dimensional data into single-dimensional messages using the sparsity feature, steering the single-dimensional messages to a service manager within the cloud infrastructure, and reconstructing the single-dimensional messages into multi-dimensional data at the service manager.

According to some embodiments, the method may further include one of analyzing or preparing a report based on the reconstructed multi-dimensional data for monitoring a cloud performance Each probe may be a physical instance of a data source within the cloud infrastructure providing state data, and the probes may include one or more of a processing unit, a monitoring sensor associated with a virtual machine, and a server. The state data may be associated with a property of a probe including one or more of a processor utilization, a memory utilization, a disk input/output (I/O) utilization, an adverse event associated with an application, a running time associated with an application, a resource allocation, context information, network usage, and disk temperature.

According to other embodiments, the method may further include initializing the multiple probes by initializing a producer thread and a consumer thread, where the producer thread collects data from the multiple probes and the consumer thread reads the collected data, and adjusting a single-dimensional data transmission rate within the cloud infrastructure according to a real-time monitoring service specification. The method may further include compressing the multi-dimensional data by separating readings of each dimension of a probe vector that includes readings from multiple data sources and processing the separate readings respectively, and/or compressing the multi-dimensional data by vectorizing messages from each probe and concatenating the vectorized messages into a single vector.

According to further embodiments, the method may further include compressing the multi-dimensional data from the multiple probes employing a sparse transformation. The sparse transformation may include a discrete cosine transform and/or a wavelet transform. The method may further include applying compressive sampling to the transformed multi-dimensional data by multiplying a single-dimensional data vector with a random construction matrix, where each column of the random construction matrix includes a series of random numbers for a probe corresponding to the single-dimensional data vector. The method may further include steering the single-dimensional data by splitting the random construction matrix into at least three segments to create at least three measurement vectors of equal size for each probe message, steering the same-size measurement vectors to a service manager, and concatenating the measurement vectors at the service manager.

According to yet other embodiments, the method may further include steering the single-dimensional data by partitioning the random construction matrix into at least nine segments to create at least three measurement matrices, steering the measurement matrices to a service manager, and obtaining individual encoded measurement vectors through summation operations at top-of-rack (TOR) switches. Communication links may be provided between switches of the cloud infrastructure and global control parameters to enable the summation operations, and the global control parameters may be generated at a data filtering module of the cloud infrastructure. The method may further include steering the single-dimensional data directly via multiple levels of switches to a service manager. The method may further include reconstructing the single-dimensional data employing a linear programming optimization, extracting sparse domain information from the reconstructed single-dimensional data, and transforming the reconstructed single-dimensional data to an original state domain by applying a reverse sparse domain transform.

According to further examples, a cloud-based datacenter configured to employ compressive sensing-based data collection in cloud monitoring may include multiple probes, multiple aggregators, and a cloud monitoring service. The multiple probes may be configured to collected data associated with performance of multiple nodes of a cloud infrastructure. The multiple aggregators may be configured to receive the collected data from the multiple probes, generate multi-dimensional data from the received data, determine a sparsity feature of the multi-dimensional data, and apply compressive sensing to compress the multi-dimensional data into single-dimensional data using the sparsity feature, the single-dimensional data being suitable for use to reconstruct the multi-dimensional data into single-dimensional data using the sparsity feature. The cloud monitoring service may be configured to manage steering of the single-dimensional data to a service manager.

According to some embodiments, the service manager may be further configured to reconstruct the single-dimensional data into multi-dimensional data. Each probe may be a physical instance of a data source providing state data, and may include one or more of a processing unit, a monitoring sensor associated with a virtual machine, and a server within the cloud infrastructure. The state data may be associated with a property of a probe including one or more of a processor utilization, a memory utilization, a disk input/output (I/O) utilization, an adverse event associated with an application, a running time associated with an application, a resource allocation, context information, network usage, and disk temperature.

According to other embodiments, the service manager may be further configured to initialize the multiple probes by initializing a producer thread and a consumer thread, where the producer thread collects data from the multiple probes and the consumer thread reads the collected data. A single-dimensional data transmission rate within the cloud infrastructure may be adjusted according to a real-time monitoring service specification. The aggregators may be configured to compress the multi-dimensional data by separating readings of each dimension of a probe vector that includes readings from multiple data sources and processing the separate readings respectively, and/or compress the multi-dimensional data by vectorizing messages from each probe and concatenating the vectorized messages into a single vector.

According to further embodiments, the aggregators may be further configured to compress the multi-dimensional data from the multiple probes employing a sparse transformation. The sparse transformation may include a discrete cosine transform and/or a wavelet transform. The aggregators may be further configured to apply compressive sampling to the transformed multi-dimensional data by multiplying a single-dimensional data vector with a random construction matrix, where each column of the random construction matrix includes a series of random numbers for a probe corresponding to the single-dimensional data vector. A random global seed may be broadcast from a central node of the cloud infrastructure such that each probe generates its own seed using the global seed and a probe identification to avoid transmitting the random construction matrix throughout the cloud infrastructure. The cloud monitoring service may be configured to steer the single-dimensional data by splitting the random construction matrix into at least three segments to create at least three measurement vectors of equal size for each probe message, steering the same-size measurement vectors to a service manager, and concatenating the measurement vectors at the service manager.

According to yet other embodiments, the cloud monitoring service may be further configured to steer the single-dimensional data by partitioning the random construction matrix into at least nine segments to create at least three measurement matrices, steering the measurement matrices to a service manager, and obtaining individual encoded measurement vectors through summation operations at top-of-rack (TOR) switches. Communication links may be provided between switches of the cloud infrastructure and global control parameters may be employed to enable the summation operations. The datacenter may further include a data filtering module configured to generate the global control parameters and/or a load balancer configured to balance transmission of the single-dimensional data through the switches by employing a pre-defined load-balancing mechanism computed from the global control parameters. The load balancer may dynamically assign the load-balancing mechanism based on a network context.

According to some embodiments, the cloud monitoring service may be further configured to steer the single-dimensional data directly via multiple levels of switches to the service manager within the cloud infrastructure. The service manager may be further configured to reconstruct the single-dimensional data employing a linear programming optimization, extract sparse domain information from the reconstructed single-dimensional data, and transform the reconstructed single-dimensional data to an original state domain by applying a reverse sparse domain transform.

According to yet other examples, a computer-readable storage medium may store instructions for compressive sensing-based data collection in cloud monitoring. The instructions may include receiving multi-dimensional data associated with performance of a cloud infrastructure collected by multiple probes within the cloud infrastructure, determining a sparsity feature of the received multi-dimensional data, and applying compressive sensing to compress the multi-dimensional data into single-dimensional data using the sparsity feature, the single-dimensional data being suitable for use to reconstruct the multi-dimensional data.

According to some embodiments, the instructions may further include reconstructing the single-dimensional data into multi-dimensional data at a service manager and/or one of analyzing or preparing a report based on the reconstructed multi-dimensional data for monitoring a cloud performance. Each probe may be a physical instance of a data source within the cloud infrastructure providing state data, and the probes may include one or more of a processing unit, a monitoring sensor associated with a virtual machine, and a server. The state data may be associated with a property of a probe including one or more of a processor utilization, a memory utilization, a disk input/output (I/O) utilization, an adverse event associated with an application, a running time associated with an application, a resource allocation, context information, network usage, and disk temperature.

According to other embodiments, the instructions may further include initializing the multiple probes by initializing a producer thread and a consumer thread, where the producer thread collects data from the multiple probes and the consumer thread reads the collected data. The instructions may further include adjusting a single-dimensional data transmission rate within the cloud infrastructure according to a real-time monitoring service specification, compressing the multi-dimensional data by separating readings of each dimension of a probe vector that includes readings from multiple data sources and processing the separate readings respectively, and/or compressing the multi-dimensional data by vectorizing messages from each probe and concatenating the vectorized messages into a single vector.

According to further embodiments, the instructions may further include compressing the multi-dimensional data from the multiple probes employing a sparse transformation. The sparse transformation may include a discrete cosine transform and/or a wavelet transform. The instructions may further include applying compressive sampling to the transformed multi-dimensional data by multiplying a single-dimensional data vector with a random construction matrix, where each column of the random construction matrix includes a series of random numbers for a probe corresponding to the single-dimensional data vector. The instructions may further include broadcasting a random global seed from a central node of the cloud infrastructure, where each probe generates its own seed using the global seed and a probe identification to avoid transmitting the random construction matrix throughout the cloud infrastructure, and/or steering the single-dimensional data by splitting the random construction matrix into at least three segments to create at least three measurement vectors of equal size for each probe message, steering the same-size measurement vectors to a service manager, and concatenating the measurement vectors at the service manager.

According to yet other embodiments, the instructions may further include steering the single-dimensional data by partitioning the random construction matrix into at least nine segments to create at least three measurement matrices, steering the measurement matrices to a service manager, and obtaining individual encoded measurement vectors through summation operations at top-of-rack (TOR) switches. The instructions may further include providing communication links between switches of the cloud infrastructure and global control parameters to enable the summation operations, and/or generating the global control parameters at a data filtering module. The instructions may further include balancing transmission of the single-dimensional data through the switches by a load balancer that employs a pre-defined load-balancing mechanism computed from the global control parameters. The load balancer may dynamically assign the load-balancing mechanism based on a network context.

According to some embodiments, the instructions may further include steering the single-dimensional data directly via multiple levels of switches to a service manager. The instructions may further include reconstructing the single-dimensional data employing a linear programming optimization, extracting sparse domain information from the reconstructed single-dimensional data, and transforming the reconstructed single-dimensional data to an original state domain by applying a reverse sparse domain transform.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs miming on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A server configured to employ compressive sensing based data collection in cloud monitoring, the server comprising:
    a memory configured to store instructions;
    a processor coupled to the memory, the processor configured to execute a cloud monitoring service, wherein the cloud monitoring service is configured to:
        receive multi-dimensional data associated with a performance of a cloud infrastructure collected by a probe within the cloud infrastructure; and
        compress the multi-dimensional data through a process to:
            vectorize the multi-dimensional data, and
            concatenate the vectorized multi-dimensional data into a single-dimensional data vector, wherein the multi-dimensional data is reconstructable with the single-dimensional data vector.

2. The server of claim 1, wherein the cloud monitoring service is further configured to:
    apply compressive sampling to the multi-dimensional data through a multiplication of the single-dimensional data vector with a random construction matrix, wherein each column of the random construction matrix includes a series of random numbers for the probe and the probe corresponds to elements of the single-dimensional data vector.

3. The server of claim 1, wherein a state data of the cloud infrastructure is associated with a property of the probe.

4. The server of claim 3, wherein the property of the probe includes one or more of: a processor utilization, a memory utilization, a disk input/output (I/O), and adverse event associated with an application, a running time associated with the application, a resource allocation, a context information, a network usage, and a disk temperature.

5. The server of claim 1, wherein the cloud monitoring service is further configured to:
    in response to receiving the multi-dimensional data from the probe, initialize a produce thread of the probe and initialize a consumer thread of the probe;
    send the multi-dimensional data through the producer thread to allow the producer thread to collect the multi-dimensional data from the probe; and
    send the multi-dimensional data through the consumer thread to allow the consumer thread to read the multi-dimensional data from the probe.

6. The server of claim 1, wherein the cloud monitoring service is further configured to:
    send the single-dimensional data vector through a load balancer on a network switch to allow the load balancer to balance a transmission of the single-dimensional data vector, wherein the load balancer employs a pre-defined load balancing mechanism computed from global control parameters and is configured to assign the load balancing mechanism based on a network context.

7. The server of claim 1, wherein the cloud monitoring service is further configured to:
    steer the single-dimensional data vector through multiple levels of network switches to a service manager.

8. The server of claim 1, wherein the cloud monitoring service is further configured to:
    reconstruct the single-dimensional data vector, wherein the single-dimensional data vector includes a linear programming optimization;
    extract a sparse domain information from the single-dimensional data vector; and
    transform the single-dimensional data vector to an original state domain by an application of a reverse sparse domain transform operation generated from the sparse domain information.

9. The server of claim 1, wherein the cloud monitoring service is further configured to:
    monitor a transmission rate of the single-dimensional data vector within the cloud infrastructure; and
    adjust the transmission rate of the single-dimensional data vector according to one or more real-time monitoring service specifications.

10. The server of claim 1, wherein the cloud monitoring service is further configured to:
    broadcast a random global seed from a central node of the cloud infrastructure to allow the probe to generate a seed using the random global seed and a probe identification to avoid a transmission of a random construction matrix throughout the cloud infrastructure.

11. A cloud-based datacenter configured to employ compressive sensing based data collection in cloud monitoring, the datacenter comprising:
    sets of servers within a cloud based infrastructure, wherein the sets of servers are monitored by a probe to capture a performance of the cloud based infrastructure within a multi-dimensional data;
    a cloud monitoring service executed on a server, the cloud monitoring service configured to provide control parameters to network switches, wherein the network switches include one or more of a first switch level, a second switch level, and a third switch level; and
    the network switches connected to the sets of servers, wherein the network switches are configured to:
        receive the control parameters from the cloud monitoring service at the first switch level of the network switches;

receive the multi-dimensional data at the first switch level of the network switches;

encode the multi-dimensional data at the first switch level of the network switches by compressive sampling;

determine a sparsity feature of the multi-dimensional data; and apply compressive sensing to compress the multi-dimensional data into a single-dimensional data vector using the sparsity feature, wherein the multi-dimensional data is reconstructable with the single-dimensional data vector at the third switch level of the network switches.

12. The cloud-based datacenter of claim 11, wherein the cloud monitoring service is configured to:

transmit an instruction to the probe to allow the probe to control a collection of the multi-dimensional data.

13. The cloud-based datacenter of claim 11, wherein the cloud monitoring service is configured to:

compress the multi-dimensional data through vectorization of the multi-dimensional data and concatenating the multi-dimensional data into the single-dimensional data vector.

14. The cloud-based datacenter of claim 11, wherein the network switches is further configured to:

compress the multi-dimensional data through a sparse transformation, wherein the sparse transformation includes one of: a discrete cosine transform and a wavelet transform.

15. The cloud-based datacenter of claim 11, wherein the network switches are further configured to:

employ a first communication link between the first switch level of the network switches and the second switch level of the network switches and employ a second communication link between the second switch level of the network switches and the third switch level of the network switches, wherein the first communication link and the second communication link allow summation operations of the multi-dimensional data.

16. The cloud-based datacenter of claim 11, wherein the network switches are further configured to:

filter the multi-dimensional data with a data filtering module to generate global control parameters, wherein the global control parameters are utilized to correct measurements by the probe based on the control parameters.

* * * * *